Patented Nov. 25, 1952

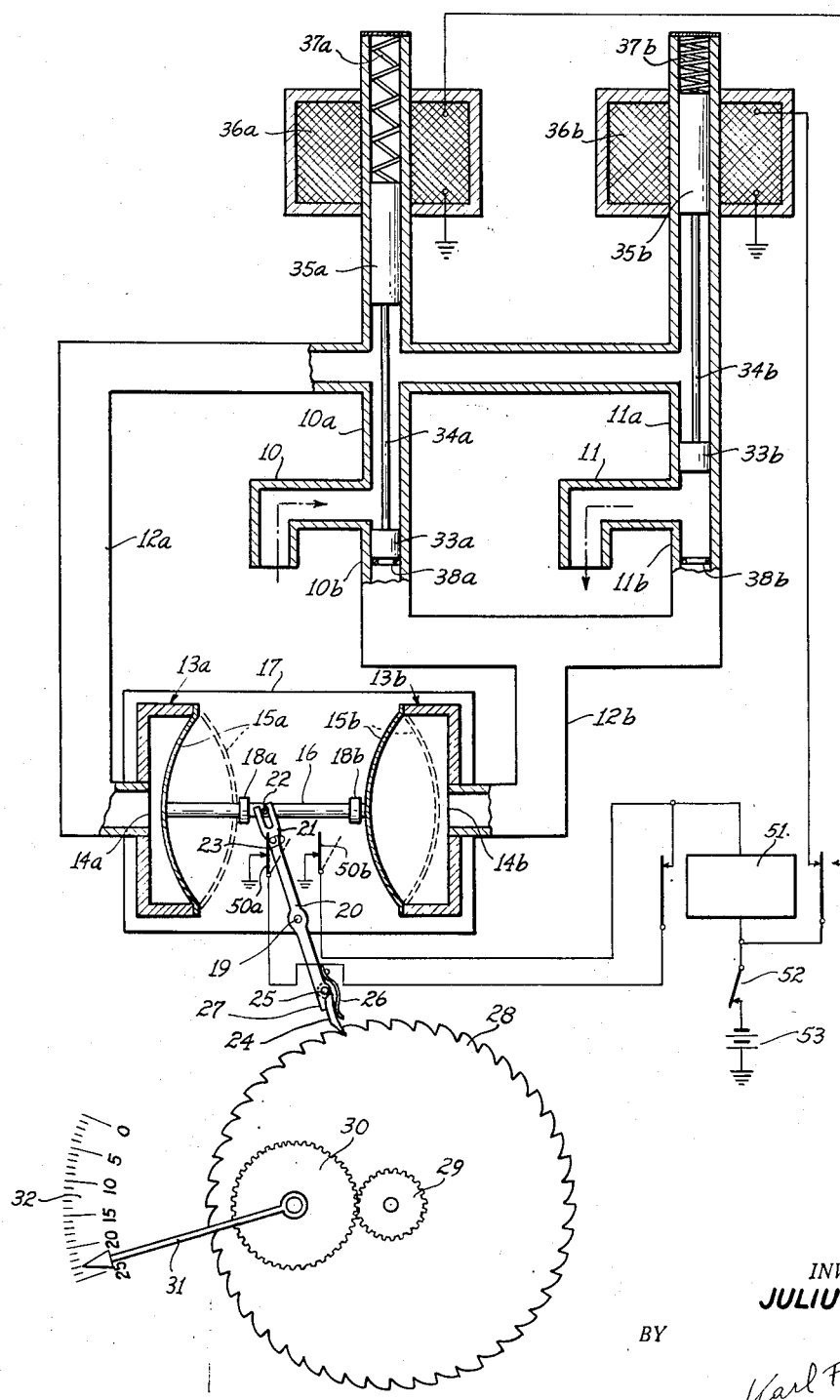
INVENTOR.
JULIUS AGIN
BY
*Karl F. Ross*
AGENT

2,619,076

UNITED STATES PATENT OFFICE 2,619,076

FLOW MEASURING DEVICE

Julius Agin, River Edge, N. J., assignor to Patterson O. Stewart, Bronxville, N. Y.

Application May 3, 1950, Serial No. 159,720

2 Claims. (Cl. 121—148)

1

This invention relates to flow measuring devices for liquids and other fluids and in particular to measuring devices designed to be connected in series with a source of fluid and a consuming apparatus.

Devices of this type, having an inlet and an outlet adapted for connection to an incoming and an outgoing channel of an existing conduit system, have already been proposed. In one type, the fluid is alternately switched to two mechanically interconnected chambers of variable volume, the expansion of one chamber due to the influx of fluid causing the other chamber to discharge the fluid previously admitted thereto into the outgoing channel. This system has the advantage that no material part of the fluid can bypass the counting mechanism, of which the variable chambers form a part, so that even comparatively small quantities of fluid per unit of time may be measured. A difficulty with such devices, however, lies in the fact that the switching mechanism must be maintained operative if fluid is to pass from the source to the consumer, so that power failure will interrupt the fluid flow; another, related difficulty is the need for bodily removing the equipment after the measuring is completed, or for providing some mechanical bypass to be rendered effective when measuring is discontinued.

An object of this invention is to provide a device of the character described in which the disadvantages enumerated above are avoided.

More particularly, it is an object of the present invention to provide such a device which can be placed in operation or inactivated by the actuation of a simple switch, without physical changes in the fluid path, and which will not work an interruption of flow when so inactivated.

A further object of the invention is to provide a flow measuring device particularly adapted for installation into an automotive vehicle for the purpose of metering the fuel consumed over a given distance of travel.

According to a feature of the invention, the selective switching of the fluid into one or the other chamber is accomplished by electric valve actuating means so arranged that, upon fortuitous or intentional de-energization of said valve actuating means, a path is automatically established for the fluid which bypasses the measuring chambers and through which the fluid may freely flow from the inlet of the device to the outlet thereof.

According to another feature of the invention, there are provided two preferably electrically

2 controlled, independently operable valves, each having a normal or unoperated and an off-normal or operated position, which when simultaneously operated or unoperated establish the said bypass for the fluid.

The above and other objects and features of the invention will become apparent from the following description, reference being had to the accompanying drawing the sole figure of which shows a somewhat schematic representation of a measuring device according to the invention.

Referring to the drawing in detail, there is shown a fluid flow measuring device according to the invention having a conduit 10 for incoming fluid and a conduit 11 for outgoing fluid. Conduit 10 is separated into two branches, 10a and 10b; conduit 11 being likewise separated into two branches 11a and 11b. Branches 10a and 11a merge to form a conduit 12a, while branches 10b and 11b merge to form a conduit 12b. Conduits 12a and 12b lead to hollow cylindrical chambers 13a and 13b, respectively, through openings 14a, 14b provided at respective ends thereof. The walls opposite these openings are formed by flexible diaphragms 15a and 15b, respectively, coupled together by a rigid bar or piston 16. Chambers 13a, 13b are fastened to a mounting plate 17 to which are also secured two bearings 18a, 18b adapted slidingly to accommodate bar 16.

Pivotally fixed to the mounting plate 17 by a pin 19 is an arm 20 which engages through its forked extremity 21 a pin 22 projecting from the bar 16. Pin 22 is located at substantially the center of the bar 16, while pin 19 is located on a line substantially midway between the chambers 13a, 13b. A third pin 23 projects from the arm 20 at a point between the pivot pin 19 and the fork 21 and oscillates between a pair of tongues 50a, 50b which it alternately engages in the extreme positions of its movement; tongue 50a forms part of a pair of normally open, or "make," contacts closed by the pin 23 in one position thereof, while tongue 50b forms part of a pair of normally closed, or "break," contacts opened by the pin 23 in its other position.

At the extremity of the arm 20 opposite the fork 21, a pawl 24 is pivoted about a pin 25. A leaf spring 26 urges the pawl in a clockwise direction against a stop 27 forming a projection of the arm. The pawl 24 engages a ratchet wheel 28 on which is mounted a step-down gear assembly comprising gears 29 and 30. Affixed to gear 30 is a pointer 31 which sweeps over a calibrated dial 32.

A valve piston 33a slides within branches 10a and 10b, selectively channeling liquid incoming from conduit 10 through one or the other of the aforementioned branches; a similar valve piston 33b slides within branches 11a and 11b, selectively channeling outgoing liquid from one or the other of the branches into conduit 11. Pistons 33a and 33b are respectively coupled through rigid shafts 34a, 34b to ferromagnetic plungers 35a, 35b. Plungers 35a, 35b comprise the cores of solenoids 36a, 36b, respectively, and bear upon compressive springs 37a, 37b, respectively, which act to displace the plungers downwardly when the associated solenoids are de-energized. Annular projections 38a, 38b below valves 33a, 33b, respectively, limit the amplitude of displacement of the plungers, the projections 38a, 38b being positioned sufficiently below the confluences of branches 10a, 10b and branches 11a, 11b to allow the valves 33a, 33b to assume positions clear of the aforementioned confluences (as shown in connection with valve 33a).

An electrical circuit comprising contacts 50a, 50b, relay 51, switch 52, and battery 53 acts selectively to energize the solenoids 36a, 36b in a manner shortly to be explained. The fixed contacts associated with tongue 50a, 50b are grounded; tongue 50b is connected to the left-hand armature of relay 51, while the tongue 50a is connected to the left-hand contact of relay 51 and to one side of the relay winding. The other side of the winding of relay 51 is connected in one path over switch 52 to grounded battery 53, and in another path through the right-hand armature and reversing contacts thereof to the coil of either one of the solenoids 36a, 36b, depending on the state of energization of the relay. The other side of each solenoid coil is grounded.

The drawing illustrates a condition immediately following the closing of "make" contacts 50a by contact pin 23. This closing action has taken place as a consequence of the distended condition of diaphragm 15b due to the filling of chamber 13a with fluid. The bulging of diaphragm 15b has moved the rigid bar 16 to the left, causing the arm 20 to rotate counterclockwise and bringing pin 23 to bear upon tongue 50a. Closing of this contact has energized relay 51 through an obvious path to battery and ground, and has caused the relay to lock over its left-hand armature through contacts 50b to ground. Solenoid 36b has been energized, causing plunger 35b to move up into the position shown and bringing valve piston 33b into position above the confluence of branches 11a, 11b. Solenoid 36a is de-energized and its core, plunger 35a, is consequently shown in a lower position whence it has been urged by compression spring 37a. Valve 33a bears against annular projection 38a and lies below the confluence of branches 10a, 10b.

Fluid subsequently incoming through conduit 10 will be channeled through branch 10a and conduit 12a into chamber 13a, which will now start to fill and will cause bar 16 to move to the right. This movement of bar 16 forces fluid out of chamber 13b, and out of the system through conduit 12b, branch 11b and conduit 11. It will be noted that although "make" contacts 50a are opened by movement of bar 16 to the right, relay 51 remains energized over its locking circuit through contacts 50b. Ratchet wheel 28 will remain motionless since pawl 24 is at this instant moving in a clockwise direction.

The action just described will continue until diaphragm 15a is in the distended condition shown in dotted lines, and diaphragm 15b is in the slackened position also illustrated by a dotted outline. Contact pin 23 will now bear upon tongue 50b, opening its "break" contacts and de-energizing relay 51. Solenoid 36a will now be energized, causing plunger 35a and piston 33a to move up; solenoid 36b will be de-energized, causing plunger 35b and piston 33b to move down. The solenoids will thus reverse their positions and an action precisely opposite to that previously described will take place. Incoming fluid will pass through conduit 10, branch 10b and conduit 12b into chamber 13b, causing the latter to refill and forcing fluid out of chamber 13a by the thrust to the left of bar 16. The fluid discharge path is now formed by conduit 12a, branch 11a and conduit 11.

The movement of bar 16 to the left causes counterclockwise motion of arm 20 and pawl 24. This motion will enable the pawl to advance ratchet wheel 28, and through step-down gears 29 and 30 will effect movement of pointer 31 across dial 32. The step-down gear assembly is provided to allow a relatively small movement of the pointer to correspond to large angular displacements of the ratchet wheel.

The bar 16 will continue to move to the left owing to the expansion of chamber 13b until pin 23 is again brought to bear on tongue 50a, at which time the condition illustrated in the drawing will again obtain and the cyclical action previously described will be repeated.

It will thus be seen that each advance of the ratchet wheel 28, corresponding to one unit on the calibrated dial 32, represents a quantity of fluid equal to that contained in the volume enclosed by the solid and dotted lines indicating the distended and slackened conditions, respectively, of diaphragm 15b, plus the volume enclosed by the solid and dotted lines similarly indicating the extreme positions of diaphragm 15a. This quantity may easily be predetermined or established by calibrating measurements and the fluid flow read directly from the dial 32.

Since the system depends for its operation on a source of electrical power (battery 53), it is of practical importance that failure of this power should not interrupt the flow of fluid to the intended destination. Furthermore, it is extremely desirable that the power source be utilized by the measuring system only when measurements are actually being carried on, in order to conserve power and reduce wear on the system. It can be seen that both these requirements are met by the proposed structure.

Opening of the switch 52 disconnects power from the measuring system and is operatively equivalent to a power failure. Removal of the power source deenergizes both solenoids, 36a and 36b, causing pistons 33a and 33b to be forced against annular projections 38a and 38b, respectively. With the valves in this position, fluid may pass from incoming conduit 10 through branch 10a to branch 11a and out through conduit 11. Thus the flow of fluid through the system is never blocked, even through the measuring system is disabled. A similar result would be obtained if, through a wiring defect, the two solenoids were simultaneously energized; in this event incoming fluid would pass through conduit 10 and branch 10b and directly out through branch 11b and conduit 11.

It will be seen from the foregoing description that there exist, in effect, two paths leading from the inlet 10 to the outlet 11 while bypassing the chambers 13a and 13b, one of these paths including the branches 10a, 11a and the other the branches 10b, 11b, and that the pistons 33a, 33b constitute means controlled by the solenoids for blocking these paths as long as one, but not more than one, of these solenoids is energized.

The device above may be advantageously used in the metering of the fuel consumption of, say, an automobile, expressed, for example, in fractions of a gallon consumed per mile. In such a case the conduit 10 may be connected in series with the fuel pump while the conduit 11 may lead to the carburetor. By closing the switch 52 and re-opening it, say, one-tenth of a mile thereafter, the number of miles per gallon obtainable with the vehicle may readily be computed from the advance of the pointer 31 over the dial 32.

It will be appreciated by those skilled in the art that the arrangement described and illustrated is subject to many variations and adaptations without departing from the scope of the invention; the embodiment particularly described is to be considered as illustrative only and not to be construed in a limiting sense. Thus it will be understood that preferably electrical valve actuating means other than the solenoids may be used for alternately connecting the two chambers to the fluid inlet, and outlet, respectively, or that switch-over means other than a relay, for example a mechanical toggle switch, may be employed for the selective energization of the valve actuating means. Also, any known mechanical or electrical counting device may be substituted for the pawl and ratchet arrangement specifically disclosed.

Furthermore, the showing of the valves proper is strictly schematical, it being apparent that other types of valves, e. g. such having plungers displaceable in a transverse, rather than longitudinal, direction with respect to the fluid flow, may be utilized if necessary or desirable.

What I claim as novel and desire to secure by Letters Patent is:

1. In a flow measuring device having two chambers and a piston reciprocated by the alternate admission of a fluid into said chambers, the combination, with switch-over means controlled by said piston, of a pair of mechanically independent valves each having an operated and an unoperated position, first conduit means forming a fluid inlet path leading to one of said valves, second conduit means forming a fluid outlet path leading away from the other of said valves, third conduit means extending from one of said chambers toward both of said valves and communicating with said first and said second conduit means in the operated position of said one and said other valve, respectively, fourth conduit means extending from the other of said chambers toward both of said valves and communicating with said first and said second conduit means in the unoperated position of said one and said other valve, respectively, thereby creating a direct connection between said inlet and outlet paths upon both of said valves occupying their unoperated positions, first and second electric valve actuating means controlled by said switch-over means for alternately operating a respective one of said valves on each reciprocation of said piston, in a sense causing reversal of the movement of the latter, and first and second mechanical valve restoring means tending to maintain said valves, respectively, in their unoperated positions.

2. In a flow measuring device having two chambers and a piston reciprocated by the alternate admission of a fluid into said chambers, the combination, with switch-over means controlled by said piston, of a pair of mechanically independent valves each having an operated and an unoperated position, first and second solenoid means controlling respective ones of said valves and energizable to place said valves in their operated positions, first and second spring means engaging respective ones of said valves and tending to maintain same in their unoperated positions in the de-energized condition of the associated solenoid means, first conduit means forming a fluid inlet path leading to one of said valves, second conduit means forming a fluid outlet path leading away from the other of said valves, third conduit means extending from one of said chambers toward both of said valves and communicating with said first and said second conduit means in the operated position of said one and said other valve, respectively, and fourth conduit means extending from the other of said chambers toward both of said valves and communicating with said first and said second conduit means in the unoperated position of said one and said other valve, respectively, thereby creating a direct connection between said inlet and outlet paths upon both of said valves occupying their unoperated positions, said switch-over means being connected to said first and said second solenoid means for alternate energization thereof, on each reciprocation of said piston, in a manner causing reversal of the movement of the latter.

JULIUS AGIN.

REFERENCES CITED

The following references are of record in the file of this patent:

UNITED STATES PATENTS

| Number | Name | Date |
|---|---|---|
| 527,979 | Henley et al. | Oct. 23, 1894 |
| 648,947 | Guvd | May 8, 1900 |
| 855,892 | Kendal | June 4, 1907 |
| 1,470,381 | Lamb | Oct. 9, 1923 |
| 2,014,664 | Nicholls | Sept. 27, 1935 |
| 2,118,079 | Goode et al. | May 24, 1938 |
| 2,372,813 | Darling | Apr. 3, 1945 |
| 2,392,536 | Kline et al. | Jan. 8, 1946 |